United States Patent [19]

Heideman

[11] Patent Number: 4,811,877
[45] Date of Patent: * Mar. 14, 1989

[54] MODULAR LUGGAGE CARRIER WITH SLIDING TIE-DOWN BRACKET STABILIZED AGAINST LUGGAGE-SECURING FORCES

[75] Inventor: Robert C. Heideman, Studio City, Calif.

[73] Assignee: Amco Corporation, Hollywood, Calif.

[*] Notice: The portion of the term of this patent subsequent to Oct. 14, 2003 has been disclaimed.

[21] Appl. No.: 163,234

[22] Filed: Feb. 26, 1988

Related U.S. Application Data

[60] Continuation of Ser. No. 82,788, Aug. 6, 1987, abandoned, which is a continuation of Ser. No. 884,423, Jul. 11, 1986, abandoned, which is a continuation of Ser. No. 439,430, Nov. 5, 1982, Pat. No. 4,616,771, which is a division of Ser. No. 88,864, Oct. 29, 1979, Pat. No. 4,358,037.

[51] Int. Cl.[4] .................................. B60R 9/04
[52] U.S. Cl. ................................ 224/321; 224/324; 224/325; 224/326
[58] Field of Search ............................ 224/309–331

[56] References Cited

U.S. PATENT DOCUMENTS

| | | |
|---|---|---|
| D. 250,461 | 12/1978 | Bott . |
| D. 250,464 | 12/1978 | Bott . |
| D. 264,203 | 5/1982 | Bott . |
| D. 282,155 | 1/1986 | Bott . |
| D. 283,117 | 3/1986 | Bott . |
| 2,605,064 | 7/1952 | Davis ..................... 224/321 X |
| 2,688,504 | 9/1954 | Parker .................... 224/321 X |
| 3,241,501 | 3/1966 | Watts ..................... 224/321 X |
| 3,519,180 | 7/1970 | Bott . |
| 3,554,416 | 1/1971 | Bott . |
| 3,610,491 | 10/1971 | Bott . |
| 3,615,069 | 10/1971 | Bott . |
| 3,643,973 | 2/1972 | Bott . |
| 3,848,785 | 11/1974 | Bott . |
| 3,951,320 | 4/1976 | Bott . |
| 4,015,760 | 4/1977 | Bott . |
| 4,055,284 | 10/1977 | Bott . |
| 4,055,285 | 10/1977 | Bott . |
| 4,099,658 | 7/1978 | Bott . |
| 4,106,680 | 8/1978 | Bott . |
| 4,133,465 | 1/1979 | Bott . |
| 4,146,198 | 3/1979 | Bott . |
| 4,156,497 | 5/1979 | Bott . |
| 4,162,755 | 7/1979 | Bott . |
| 4,165,827 | 8/1979 | Bott . |
| 4,170,322 | 10/1979 | Bott . |
| 4,174,794 | 11/1979 | Bott . |
| 4,175,682 | 11/1979 | Bott . |

(List continued on next page.)

Primary Examiner—Henry J. Recla
Assistant Examiner—Linda J. Sholl
Attorney, Agent, or Firm—Ashen Golant Martin & Seldon

[57] ABSTRACT

Slats fixed to a vehicle deck have external-flange tracks along their opposite edges. Brackets engage these tracks—by a lip that projects inwardly from the side wall of each bracket to capture the flange. The brackets can be slid by a user along the tracks and locked at any point along the slats by clamping plates inside the brackets. The clamping plates are forced against the slats as by screws in the tops of the brackets. One type of bracket carries an arch-shaped tie-down member and is also adapted for attachment of crossbars, spanning the outboard slats, but only at certain discrete points along the slats. Each tie-down member is fixed to its tie-down bracket below the inwardly projecting lip, or in any event at a point in the side wall, of the bracket. This configuration preserves clamping force when a strap or cord is tightly cinched from the bracket over luggage, resulting in very strong upward force on the tie-down member. If the tie-down members were attached to the tops of the brackets as is common in the prior art, the upward forces would reduce the force applied by screws or the like between the tops of the brackets and the clamping plates.

3 Claims, 4 Drawing Sheets

U.S. PATENT DOCUMENTS

| | | |
|---|---|---|
| 4,182,471 | 1/1980 | Bott . |
| 4,222,508 | 9/1980 | Bott . |
| 4,239,139 | 12/1980 | Bott . |
| 4,266,708 | 5/1981 | Bott . |
| 4,274,570 | 6/1981 | Bott . |
| 4,277,009 | 7/1981 | Bott . |
| 4,295,587 | 10/1981 | Bott . |
| 4,323,182 | 4/1982 | Bott . |
| 4,342,411 | 8/1982 | Bott . |
| 4,364,500 | 12/1982 | Bott . |
| 4,427,141 | 1/1984 | Bott . |
| 4,428,517 | 1/1984 | Bott . |
| 4,431,123 | 2/1984 | Bott . |
| 4,432,478 | 2/1984 | Bott . |
| 4,433,804 | 2/1984 | Bott . |
| 4,440,333 | 4/1984 | Bott . |
| 4,442,961 | 4/1984 | Bott . |
| 4,448,336 | 5/1984 | Bott . |
| 4,460,116 | 7/1984 | Bott . |
| 4,473,178 | 9/1984 | Bott . |
| 4,501,385 | 2/1985 | Bott . |
| 4,516,709 | 5/1985 | Bott . |
| 4,516,710 | 5/1985 | Bott . |
| 4,588,117 | 5/1986 | Bott . |
| 4,616,771 | 10/1986 | Heideman ............ 224/321 |

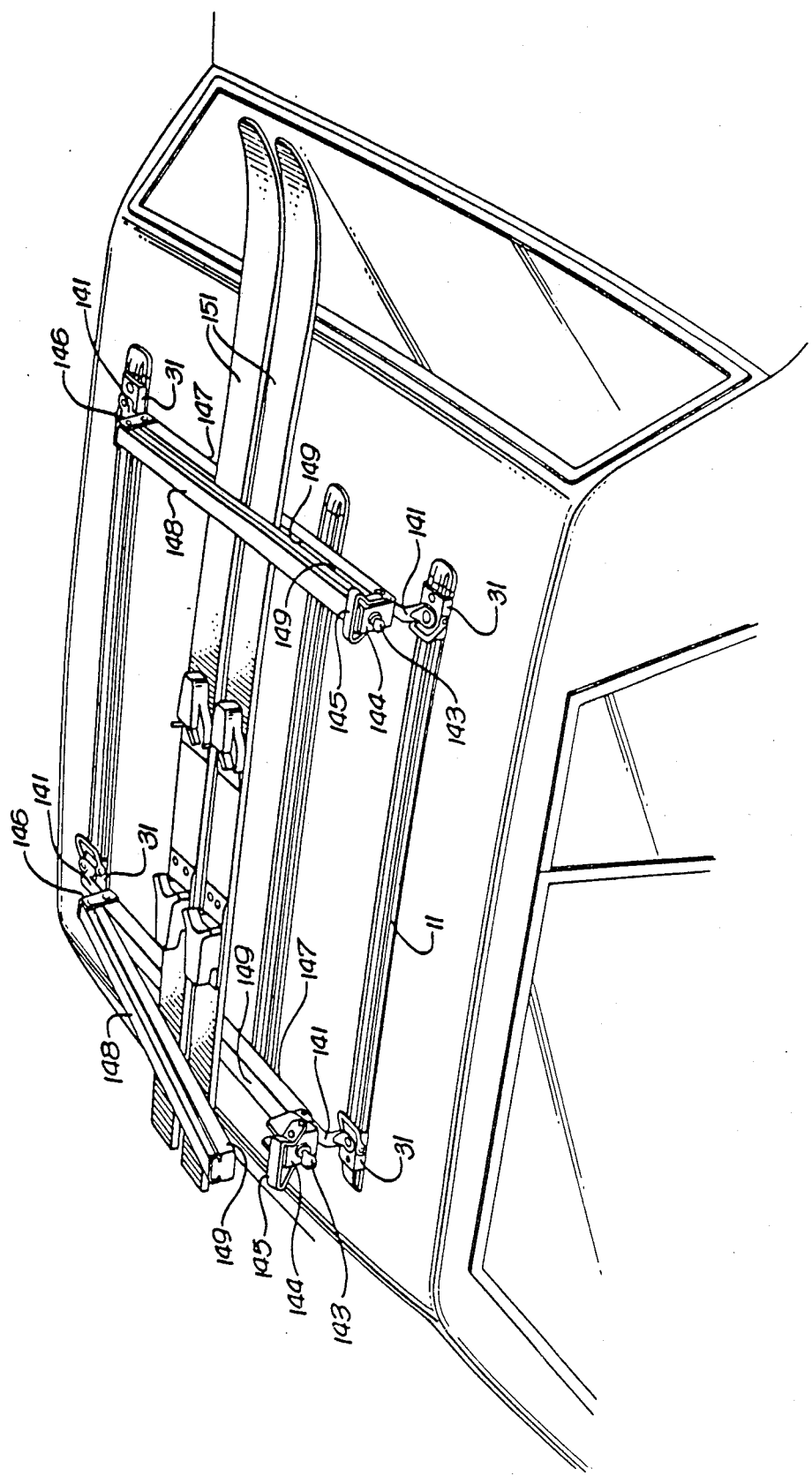

MODULAR LUGGAGE CARRIER WITH SLIDING TIE-DOWN BRACKET STABILIZED AGAINST LUGGAGE-SECURING FORCES

RELATED APPLICATIONS

This is a continuation of application Ser. No. 082,788 filed on Aug. 6, 1987, now abandoned, which is a continuation of application Ser. No. 884,423, filed July 11, 1986, now abandoned, which was a continuation of application Ser. No. 439,430, filed Nov. 5, 1982, and now issued as U.S. Pat. No. 4,616,771, which was in turn a divisional of application Ser. No. 88,864, filed Oct. 29, 1979, and also issued as U.S. Pat. No. 4,358,037.

BACKGROUND

1. Field

This invention is in the field of vehicle-mounted luggage carriers. It relates in particular to improvements in the type of carrier which has two or more low slats permanently affixed to the vehicle, and associated with each slat a pair of slidable, lockable tie-downs.

2. Prior Art

Earlier luggage carriers of the permanently affixed type simply provided an enclosed area for luggage, often with fixed, elevated siderails and with endrails or crossbars that were slidable fore and aft along the siderails. In some cases mechanisms were provided for clamping the slidable endrails at particular positions along the siderails, and in some cases eyelets were provided in the siderails for securing ropes. Examples of these types appear in U.S. Pat. No. 3,554,416, filed in 1968 and issued to Bott in 1971.

By 1970 it was becoming customary to protect the vehicle surface with permanently affixed slats, of shallow cross-section, to support the luggage. Such a construction appears, for example, in U.S. Pat. No. 3,623,642, issued in 1971 to James Stephen.

Some of the slats used for this purpose were made of roll-formed sheet metal. In certain particular roll-formed designs, each slat, viewed in lateral cross-section, consisted of a pair of upstanding outer walls, a pair of upstanding inner walls spaced inward from the outer walls, two substantially horizontal (but sometimes arched) top supporting surfaces spanning the gap between each outer wall and its adjacent inner wall, and a recessed horizontal "web" portion connecting the bottom ends of the two inner walls. The luggage load was supported solely upon the two outer walls of the roll-formed sheet-metal slat, the inner walls being shallower and the "web" being elevated above the vehicle surface or any intermediate plastic or rubber mounting pad. Thus the principal purpose of the two inner walls and intervening web was to give the structure rigidity and style, and permit use of an adhesive-affixed or snap-in plastic trim strip down the recessed center of the slat, between the inner walls. Examples of such pre-1973 support slats were those in general production by the Amco Manufacturing Corporation, of North Hollywood, Calif., and others in use on Ford automobiles.

Commercial popularity later shifted to structures more compatible with the low, streamlined styling of modern vehicles. The upstanding siderails disappeared, and the tie-down function was transferred to the slats—which now extended most of the length of the mounting surface, and were either roll-formed sheet metal or extrusions. With this general design shift came an assortment of drawbacks:

Because the slats were very low and shallow, they were not readily amenable to attachment of cord or rope, so it became necessary to provide tie-downs affixed stationarily or slidably to the slats. (By "tie-down" is meant a loop, eye, hook or similar structure about or through which a rope or the like may be tied, strung or otherwise fastened. By "rope or the like" is meant a rope, cable, chain, strap, webbing, elastic cord, thong, or other elongate, generally but not necessarily nonrigid securing element —whether or not provided with an attached eye, hook or other fastening termination.) Stationary tie-downs proved inconvenient in use. Slidable tie-downs were attached either by means of external tracks or flanges along the top upper edges of the slats, or by making use of the central groove—previously used only for trim strips or other visual effects. One natural way to make use of the groove was to form it with a previously well-known conventional dovetail cross-section, or other comparable well-known retaining cross-section, so that it could hold a complementarily shaped nut slidably captive, and thus provide a slidable attachment for a tie-down. Unfortunately both types of slidable tie-down were incompatible with the snap-in plastic trim strips mentioned earlier. If the tie-downs were connected by means of external tracks, the clamping screws engaged and marred the finish of the trim strips. If the tie-downs were connected by means of shaped nuts which slid in a dovetail or other retaining groove, the trim strip had to be removed to permit sliding of the nuts and tie-downs along the slats.

Elevated crossbars were of course still necessary for certain specialized uses, and it was standard practice to attach these to the slats temporarily by the same or similar sliding elements as used for the tie-downs. This attachment arrangement in general serves a useful purpose, and has found extensive commercial use. However, with the added leverage of the crossbars the clamping mechanisms holding the tie-downs to the slats could work loose, permitting the crossbars to slide along the slats—and this in turn could lead to damage of the retaining nuts, the slats, or even the vehicle top or luggage.

Representative of this generation of carriers are U.S. Pats. Nos. 4,015,760 and 4,099,658, both to Bott, issued in 1977 and 1978 respectively, and U.S. Pat. No. 4,132,335, which issued in 1979 to Ingram. Some features of the last two patents mentioned represent efforts to resolve some of the drawbacks mentioned, but because of more solid or more elaborate construction these features are objectionably costly.

OBJECTIVES OF THE INVENTION

The present invention is directed to resolution of the drawbacks outlined above, at moderate expense, in a luggage carrier compatible with modern standards of styling and streamlining.

More particularly, it is an object of the invention to provide a slidable, lockable bracket for use in a vehicle-mounted luggage carrier having a plurality of slats, each slat being formed with external tracks along its opposite edges, which bracket is compatible with decorative trim along the centers of such slats and provides a means of attachment for a tie-down or a crossbar.

Another object of the invention is to provide a luggage-restraining device which, though adapted to prevent luggage from sliding along the slats of such a carrier, is also adapted to assume when not in use a lowprofile configuration with respect to such slat, for stylish appearance and minimal wind resistance.

Yet another object of the invention is to provide a system for attachment of a crossbar between a pair of slats of such a carrier, whereby the previously mentioned slidable, lockable bracket provides a means of attachment for the crossbar but attachment is possible only at a very small, limited number of discrete points along the slats—at which points additional provision is made for overcoming the natural tendency of weight applied to the crossbars, acting through the crossbar leverage, to dislodge the bracket locking mechanism.

A further object of the invention is to provide accesories for use in carrying particular items which are cumbersome or awkward to secure to such a vehicle carrier but which it is particularly often desired to carry on a vehicle—such as, for example, a bicycle or skis.

One yet further object of the invention is to provide in combination all of the components of a vehicle-mounted carrier which implements the several objects enumerated above.

The manner in which my invention implements these objects may be understood and appreciated by reference to the following detailed description and the accompanying drawings, of which:

BRIEF DESCRIPTION OF THE DRAWINGS

FIG. 7 is an isometric view of the preferred embodiment of FIG. 1, but with part of that preferred embodiment removed and replaced by an accessory which facilitates carrying skis.

DETAILED DESCRIPTION OF PREFERRED EMBODIMENTS

Generally speaking, the instant invention is a vehicle-mounted multipurpose carrier, taking the form of several modular elements which can be used in various combinations and ways to quickly and easily accommodate a great variety of items to be carried. However, the basic carrier—designed to remain permanently attached to the vehicle—is a low, streamlined structure which harmonizes and cooperates with modern vehicle styling.

Four parallel roll-formed slats attached to a vehicle top or rear deck have external tracks formed along their opposite edges. On each slat is a pair of brackets, which engage the external tracks of the sslat, and are slidable along substantially the whole length of the slat and lockable at any point along the sliding range. The brackets each comprise a housing which engages the external tracks, an intermediate clamping member retained within but movable with respect to the housing, and means for applying force between the housing and the clamping member to press the clamping member against the tracks. This arrangement permits locking the brackets along the slat without marring a plastic trim strip which is retained in a central groove in the slat.

The four brackets which slide along the two inner slats are each provided with hinged end-stops which can be turned up to engage and restrain luggage, or when not in use turned down to closely hug the slats—minimizing wind resistance and presenting a trim appearance.

The brackets which slide along the two outer slats are each provided with tie-downs for use with rope or the like, and in addition are adapted to support special-purpose crossbars spanning the outer slats. These crossbars are attachable to the brackets only when the latter are in certain discrete positions (related to the crossbar functions) where extra resistance to sliding is provided. Special clamps are provided for securing bicycles by their handlebars to one crossbar, with the bicycle seat held against the other crossbar by straps or elastic cord. Another type of crossbar is a ski-rack type, with a key-releasable ski clamp.

Figure 1:
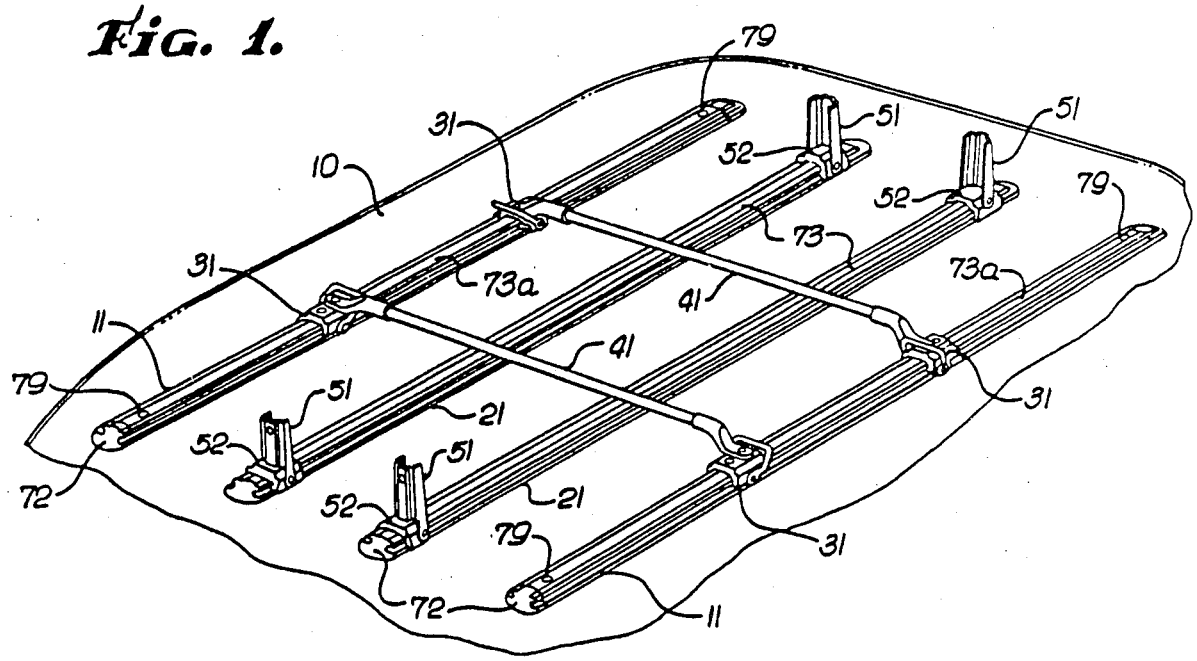
FIG. 1 is an isometric elevation showing a preferred embodiment of the present invention, installed on the top of a vehicle.

The principal modules of a preferred embodiment of the invention appear in FIG. 1.

Two outer or outboard slats 11, mutually parallel, are affixed permanently as by screws or rivets to the top 10 of a vehicle. Two inner or inboard slats 21 are similarly affixed to the vehicle top 10, between and generally parallel to the outer slats 11. The inboard slats 21 may be omitted, or addition alones added, as preferred.

Slidably fastened to each outboard slat 11 are two tie-down brackets 31, which are capable of being moved to any position along the respective slat 11 and locked in that position using an internal clamping mechanism, to be described.

Also fastened to the outboard slats 11, and spanning those slats, are two crossbars 41. The crossbars 41 are optionally and removably attached to the slats 11 by means of the respective brackets 31; however, the slats 11 and attachment means are adapted for this attachment only at a limited number of specific locations along the length of the slats 11. Two of these locations are illustrated in FIG. 1, and two others in FIG. 7. Another application using one of the locations illustrated in FIG. 1 and one of those illustrated in FIG. 7 appears in FIG. 5. Thus there are four positions in which the crossbars 41 can be attached to the slats 11; at these positions, as will be seen, a location reinforcement mechanism is provided, so that the crossbars and any weight placed on them do not depend solely on the bracket-clamping device mentioned earlier to maintain correct positioning of the crossbars along the slats.

The four positions at which crossbar attachment is permitted and position reinforcement is provided are selected for optimum use of certain accessories to be described hereunder, and in the case of the general-purpose crossbars shown in FIG. 1 simply as generally optimum locations for use of those crossbars. The crossbars are readily and quickly installed or removed, so that the tie-down brackets 31 can be positioned, locked, and used without the crossbars 41 at any point along the slats 11.

Slidably fastened to each inboard slat 21 are two end-stops 51, each positionable at any point along the respective slat 21 and lockable at that point using an internal clamping mechanism. In addition each end-stop 51 is adapted to be manually moved between two configurations—(1) one position in which the end-stop is upwardly extending for the purpose of engaging luggage placed upon the slats 21 and/or 11, to prevent such luggage from sliding longitudinally with respect to the slats and vehicle; and (2) a second position in which the end-stop is very low, hugging or recessed within the respective slat, to present a trim or "tight" appearance and minimum wind resistance.

Figure 2:
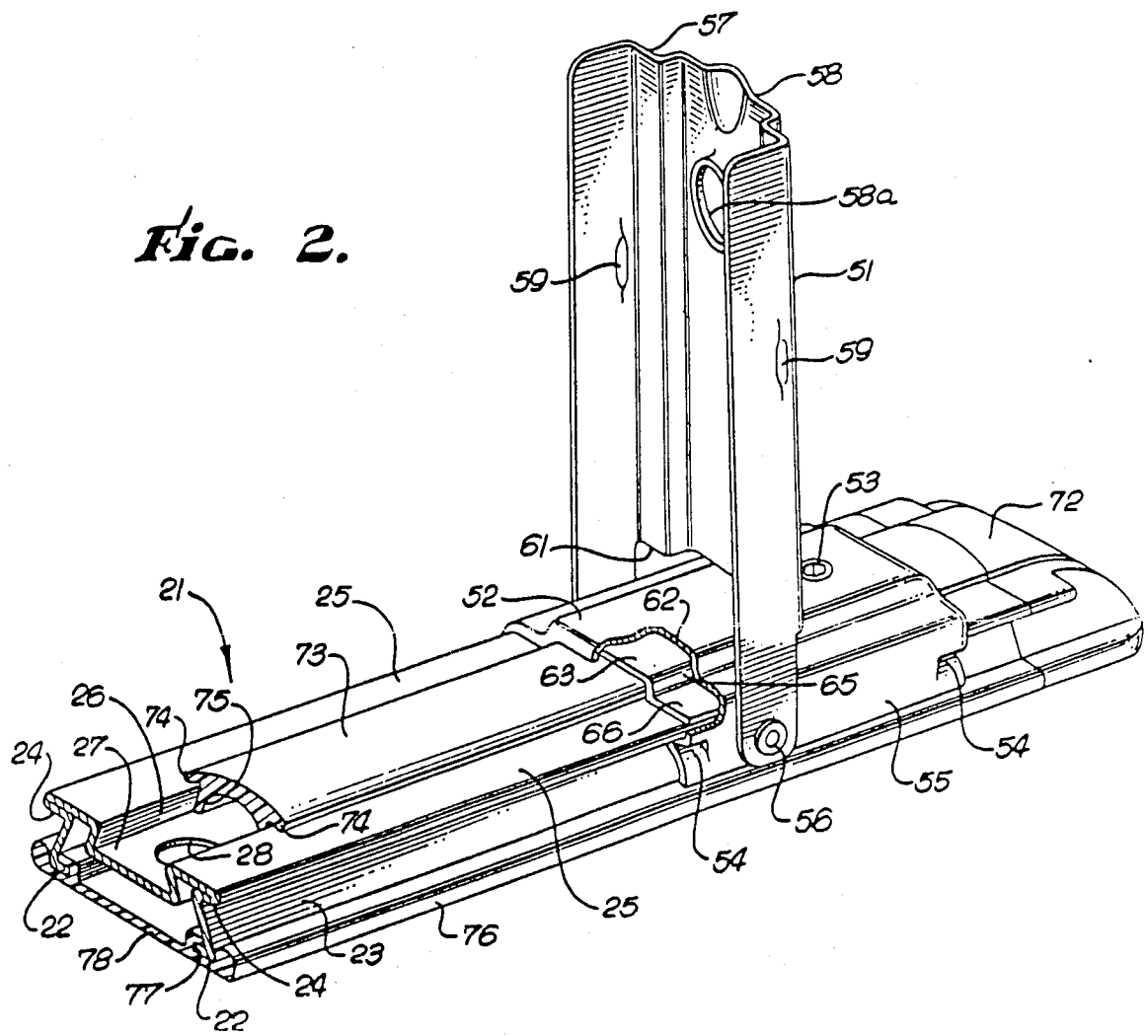
FIG. 2 is an enlarged view, also isometric but partly cut away for clarity, of part of the FIG. 1 embodiment.
Figure 3:
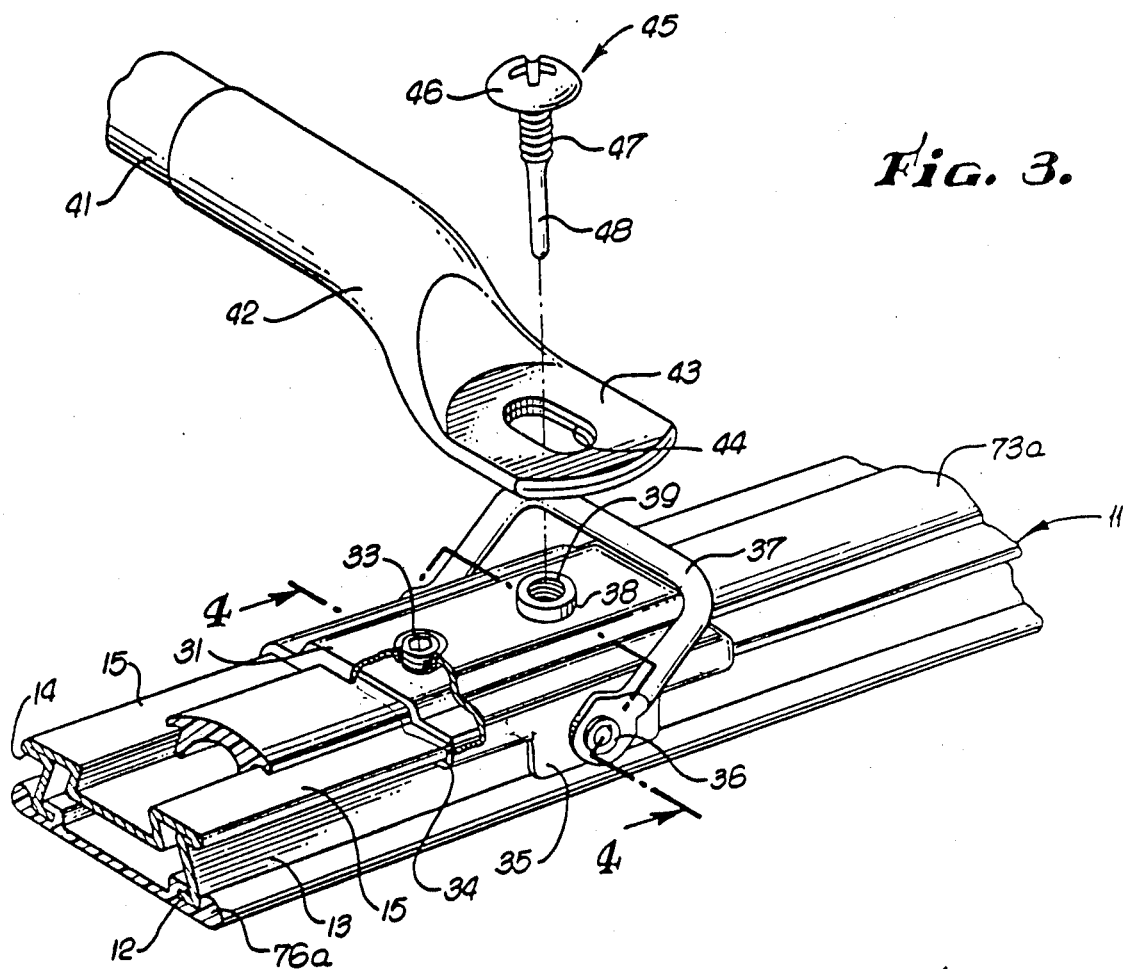
FIG. 3 is a similar enlarged view of another part of the FIG. 1 embodiment.
Figure 4:
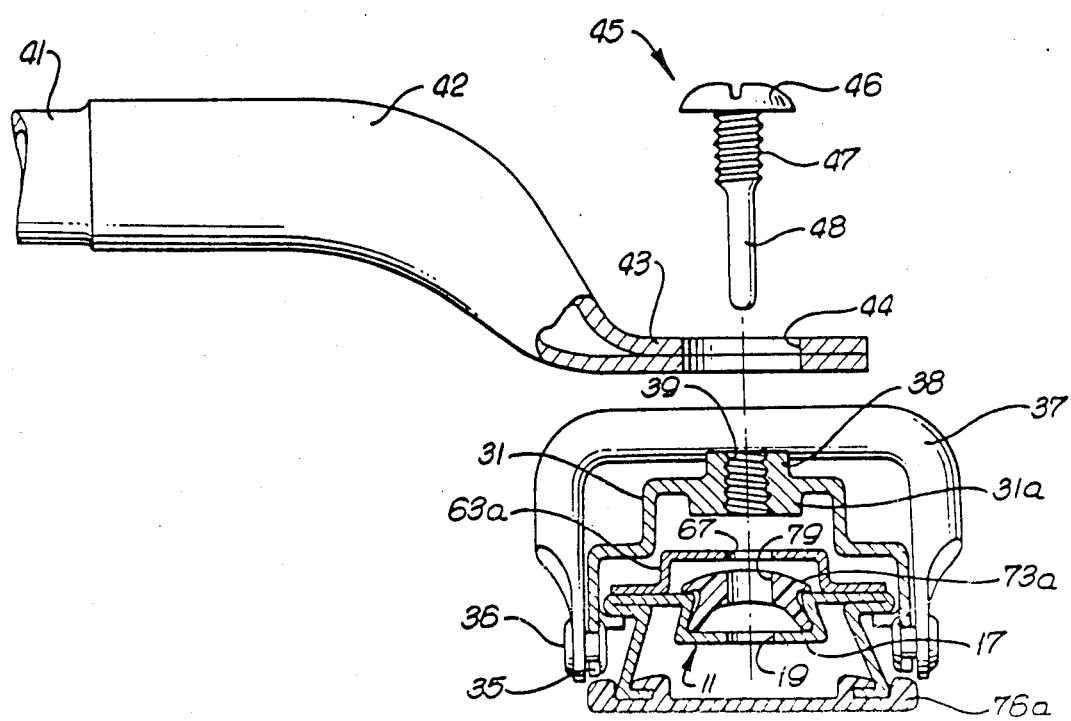
FIG. 4 is an elevation, principally in cross-section, taken along the line 4—4 of FIG. 3.

Some details of the FIG. 1 construction appear more clearly in FIGS. 2 through 4. As shown in FIG. 2 a preferred construction for the slats 21 (and for the outboard slats 11 as well) is roll-formed sheet metal, and in particular comprises two upstanding outer walls 23, two upstanding inner walls 26, two substantially horizontal top supporting surfaces 25 spanning the gap between each outer wall and its adjacent inner wall, and a horizontal "web" portion 27 connecting the bottom edges of the two inner walls 26. The web portion 27 is recessed relative to the upper surfaces 25, but well above the bottom edges of the outer walls 23. An essential aspect of this embodiment is the flattened outer corner or edge 24 along each side of the roll-formed cell; these flattened portions serve as external gripping surfaces or tracks for slidable attachment of the end-stops 51, as will be seen (and, in the case of the outboard slats 11, for slidable attachment of the tie-down brackets 31). Other features of the slats 21 (and 11) include the inwardly directed rolled edge 22, which helps to preserve the appearance and condition of the metal edge and of the vehicle top 10; and mounting holes such as 28 in the horizontal "web" section 27.

Also helping to preserve appearance and condition of the vehicle top 10 and metal edge is a mounting pad or gasket 76, which has a T-groove section 77 near each outer edge, specially formed to receive the rolled-in edge 22 of outer wall 23. The mounting pad also has a continuous flat web section 78, connecting and stabilizing the T-groove sections. It will be noted that the web section 78 of gasket 76 is flat and shallow, and does not engage the underside of the corresponding metal web section 27; thus any weight placed upon the slat 21 (or 11) is supported entirely by the outer walls 23, the inner walls 26 contributing no support.

Additional plastic trim features are end-cap 72 and trim strip 73. The end-cap 72 may be made in such a way that it blocks the end of the track 24, so that the end-stop 51 (or brackets 31) cannot be slid off the end of the slat. If preferred, however, the end-cap 72 may be made in such a way that it permits the end-stop 51 (or brackets 31) to slide off the end of the slat for separate storage when not in use; this is simply a matter of design preference. The trim strip 73 is a snap-in type, with lips 74 extending beyond the central groove formed by walls 26 and web 27, and retaining protrusions 75 which extend into that groove and exert light retaining pressure against the walls 26.

The end-stop 51 is slidably secured to the slat 21 by means of a sliding bracket 52 which as shown is contoured to clear the trim strip 73 but closely surround, as by inwardly dented portions 54 of downward extensions 55 on each side, the external tracks 24. The end-stop 51 is hinged to the sliding bracket 52 as by rivets 56 on each side, secured to the downward extensions or ears 55 on each side of the bracket 52. This pivoting attachment permits the end-stop 51 to be manually swung down (counterclockwise in FIG. 2) to a position just above and closely hugging the slat 21. For this purpose the end-stop 51 is contoured as at 58 to clear the trim strip 73 when the end-stop 51 is in lowered position; and is swaged or dimpled as at 59 to provide a "snap-action" detent, holding the end-stop firmly against the slat 21 and thus avoiding rattles. The end-stop is cut in as at 61 to exactly the proper distance from the pivot 56, taking into account the height of the bracket 52 above the rivet 56 position, so that the end-stop 51 when hinged upward will stand substantially vertical. The pivot 56 must be at a suitable distance from the end of the bracket (the left end, as drawn in FIG. 2) so that when the end-stop 51 is lowered against the slat 21 the cut-in edge 61 clears the bracket 52—but only by a slight distance, so that an unsightly gap is avoided.

While a preferred embodiment as described above involves a hinge action to accomplish extension and retraction of the end-stop 51 with respect to the bracket 52, other mechanisms for extension and retraction—such as, merely for example, telescoping structures, folding structures, or screw structures—are also workable and within the scope of certain of the appended claims.

The end-stop 51 and its sliding bracket 52 may be locked against the tracks 24 by means of an internal clamping mechanism, mentioned earlier. This mechanism consists of an intermediate clamping plate, visible in FIG. 2 where the bracket 52 housing is cut away at 62, and a set-screw 53 which is recessed within the housing 52. The intermediate clamping plate has two lower edges 66 which engage the upper surfaces 25 of the tracks 24, two generally vertical sections 65 permitting clearance of the trim strip 73, and one generally horizontal intermediate section 63 which is depressed by set-screw 53 when the latter is screwed down into the bracket housing 52. If preferred, the intermediate clamping plate could engage the track surface 25 on only one side of the slat 21, the other edge of the clamping plate being supported internally within the bracket 52.

The foregoing description of the end-stop brackets 52 applies equally well to the tie-down brackets 31 shown in FIGS. 3 and 4, except that, of course, there is no end-stop 51; hinged to each tie-down bracket 31 there is instead a tie-down loop or eye 37, or if preferred a hook or other structure through or about which a rope or the like may be tied, strung or otherwise fastened. Downward extensions 35 may as shown be shorter longitudinally than the extensions 55 of FIG. 2. The pivot attachment 36 is by a rivet the like through downward extension or ear 35, and the bracket 31 is contoured to clear the trim strip 73a and closely surround, as by an inwardly angled bottom edge 34 on each side, the external tracks 14 of slat 11. The slat 11 is identical to the slat 21 previously described, except for certain essential locating holes to be mentioned shortly, and is provided with identical plastic end-caps (not shown) and mounting pad 76a—engaging inwardly rolled bottom edge 12 of the slat 11.

However, there are certain essential differences in the tie-down bracket 31, relative to the end-stop bracket 52. These differences relate to the attachment of crossbars 41:

Upstanding pillar 38, which is integral with the bracket housing 31, provides an anchor point for the crossbar 41. The downward termination 42 of the crossbar 41 comprises a flattened horizontal section 43 adapted to engage the flat horizontal top surface of the bracket 31, while the hole 44 in the horizontal section 43 engages the pillar 38. Pillar 38 is not essential, as screw 45 adequately secure the cross bar 41. The underside of the bracket housing 31 carries a downward extending enlargement 31a below and surrounding the area of the base of the pillar 38. The enlargement 31a adds strength to the structural attachment of the pillar 38, so that force applied to the pillar via the crossbar 41, 42 does not deform or otherwise damage the bracket 31 or attached pillar. A threaded hole 39 passes vertically through the pillar 38, bracket housing 31 and enlargement 31a, accommodating special screw 45 which secures the crossbar to the bracket. The screw 45 has a screwdriver head 46, threads 47 which mate with those of hole 39, and a turned-down (that is to say, smaller-diameter) extension 48 which after installation extends downward beyond the bottom surface of enlargement 31a. The extension 48, when the screw 45 is threaded fully into the mating hole 39, passes through circular holes or short slots 67 in the clamping plate 63a, 79 in the trim strip 73a, and 19 in web portion 17 of roll-formed slat 11. Clamping plate 63a, trimstrip strip 73a, and web 17 are identical to the corresponding elements 63, 73 and 27 of FIG. 2, with the exception of the respective circular holes or slots 67, 79 and 19. When crossbar 41 is to be attached, tie-down 37 is readily pivoted out of the way to either the right (as drawn in FIG. 3) or left of the pillar 38, to clear the crossbar. The extension 48 interacts with the holes or slots 67, 79 and 19 to permit crossbar attachment only at the particular locations along the slats where the holes are provided; and at those particular locations provide reinforced positioning along the slat, not solely dependent upon the clamping action previously described. This arrangement tends to prevent the bracket 31 from being loosened and slid along the slat 11 by weight or other forces applied to the crossbar 41 and through the leverage of the downward termination 42. The holes or slots also help a user to find quickly the locations along the slat appropriate for the various types of crossbars.

Figure 5:
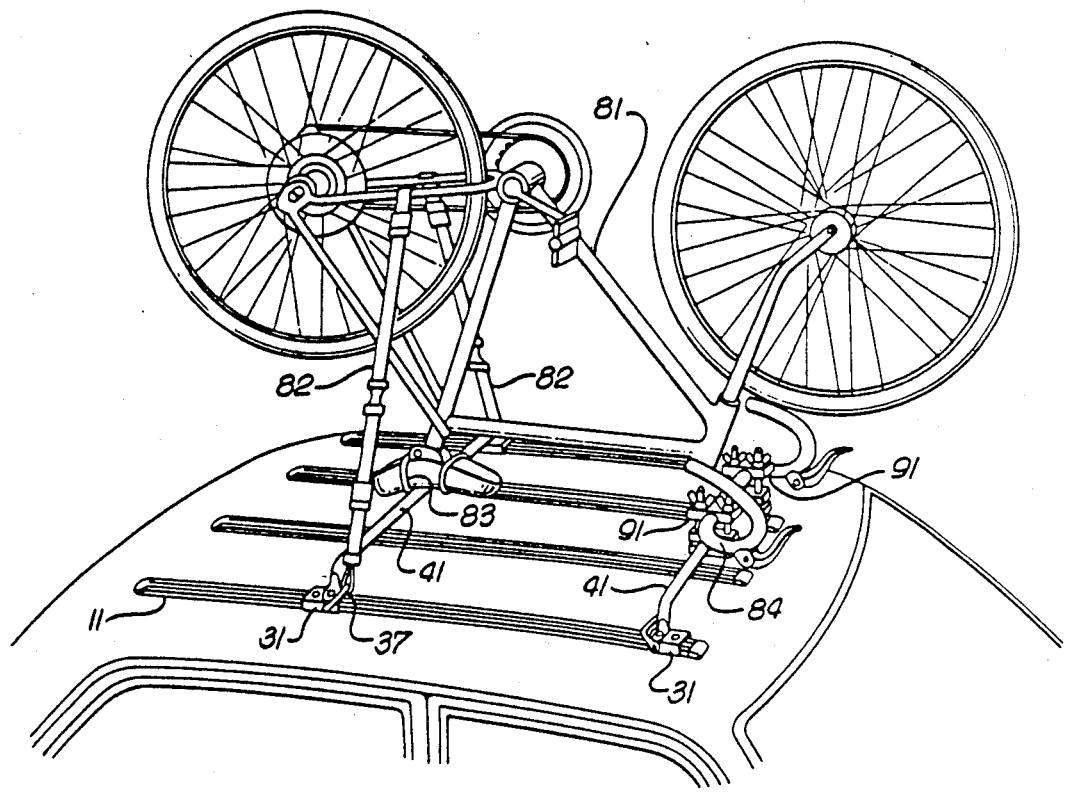
FIG. 5 is an isometric view of the preferred embodiment of FIG. 1 in use with an accessory which facilitates carrying of a bicycle.

For example, the general-purpose crossbars 41 when used to help secure or support miscellaneous luggage may be placed at the two intermediate locations along the slat illustrated in FIG. 1. The spacing of these locations along the slats in terms of fractions of the slat lengths, or in terms of absolute distances, of course varies with the overall slat lengths and in turn the size of the vehicle surface on which the slats are installed; however, as suggested in FIG. 1 the crossbar attachment points for a relatively large vehicle may be spaced inwardly from the slat ends roughly 30% of the slat length. This spacing is also suitable for use with the bicycle-mounting module shown in FIGS. 5 and 6. Additional crossbar attachment points are provided at the extreme ends of the slat. On a smaller vehicle, as indicated in FIG. 5, it may generally be more appropriate to provide only three crossbar attachment points—one at each end, and one 35% or 40% forward from the rear end. This intermediate attachment in combination with the front end attachment will accommodate a standard bicycle, as illustrated in FIG. 5. For the ski-rack module, as shown in FIG. 7, for almost all autos except station wagons the extreme end locations are most appropriate.

Figure 6:
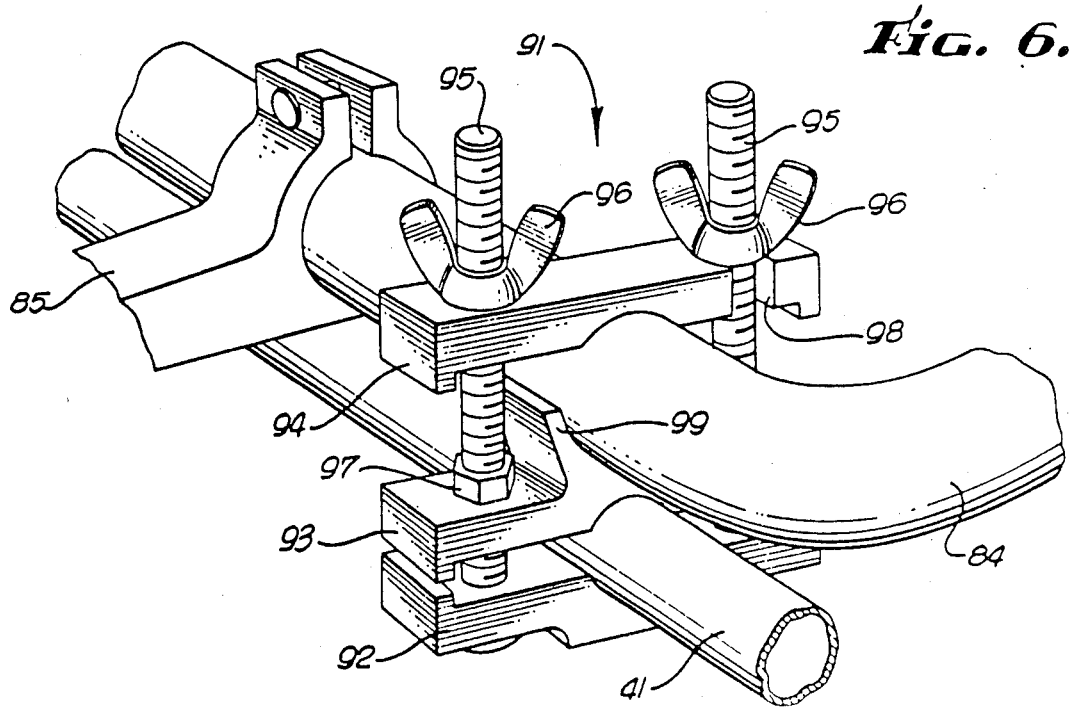
FIG. 6 is an enlarged view of part of the accessory shown in FIG. 5.

As shown in FIGS. 5 and 6, the bicycle-mounting module consists of the standard outboard slats 11 (the inboard slats not being used, but of course remaining on the vehicle), four tie-down brackets 31, two crossbars 41, two special clamps 91, a pair of stabilizing straps 82 and an elastic cord, sometimes called a "bungy cord," 83. As illustrated a bicycle 81 is positioned upside-down above the vehicle, with the bicycle seat above one of the crossbars 41 and the handlebars 84 above the other crossbar 41. Each of the two clamps 91 is actually a dual-function device, the lower two jaws 92 and 93 being secured to the crossbar 41 and the upper two jaws 93 (through its upward extension 99) and 94 firmly gripping the handlebar 84.

The three jaws 92, 93 and 94 are held together by a pair of bolts 95, the lower two jaws 92 and 93 being held to the crossbar by nuts 97, in cooperation with bolts 95, and the upper jaw 94 being drawn toward the lower two by the action of wing nuts 96. The two bolts 95 pass through holes in the three jaws 92, 93 and 94; one of these holes in the upper jaw 94 is opened outward to one side of the jaw 94 to form a slot 98. This construction permits the upper jaw 94 to be swung out of the way of the handlebar 84 after the wing nuts 96 have been backed only partway up the bolts 95, rather than requiring complete removal of the wing nuts and upper jaw to place the bicycle on the rack or remove it from the rack. The bungy cord 83 holds the seat to the crossbar 41 upon which it rests, and the straps 82 stabilize the bicycle laterally by attachment between the bicycle frame and the tie-down loops 37 on the outboard brackets 31.

The ski-rack module, illustrated in FIG. 7, comprises two substantially identical special-purpose crossbars 141, mounted to the outboard slats 11 and tie-down brackets 31 as previously described for the general-purpose crossbars 41 of FIGS. 1 and 3 through 6. Attached to each crossbar 141 is a ski mount capable of holding and securing a plurality of skis, and comprising a lower bar 147 attached firmly to the crossbar 141, a vertical hinge or pivot 146 secured to one end of the lower bar 147, an upper bar 148 attached at one end to the hinge 146, a pair of compliant pads 149 disposed along the mutually facing sides of the bars 144 and 148, and a locking mechanism at the end of the bars opposite the end where the hinge 146 is.

The locking mechanism may take various forms, one favored embodiment as illustrated comprising a hasp 145 which when in an upper position (as shown at the left in FIG. 7) blocks the upper bar 148 from pivoting vertically in or out of its horizontal position, parallel to the lower bar 147. The hasp 145 may be swung outward (as shown at the right end of FIG. 7) to permit the upper bar 148 to move in and out of the horizontal position. In the preferred embodiment shown, the hasp can be held in its inward position or released by a security lock, contained within lock housing 144 and controlled by a key 143. When the upper bar is moved to its horizontal position, parallel to the lower bar, and secured by the hasp, it firmly but compliantly retains up to six skis side by side, though only two skis 141 are illustrated.

It is intended to be understood that the foregoing discussion of preferred embodiments is offered only by way of example, and not intended to be interpreted as limiting the scope of the invention—which scope is defined by the appended claims.

I claim:

1. A luggage carrier adapted for substantially permanent attachment to a vehicle, and for use with luggage-constraining straps or the like that in use are cinched tightly over such luggage, generating upward forces on the carrier; said carrier comprising:

a pair of slats adapted for mutually parallel, side-by-side, substantially permanent attachment to and upon such vehicle, each slat having two generally upstanding sides and on each side a laterally projecting flange that is spaced above the vehicle when the slat is attached to the vehicle;

on each slat a slidable bracket that includes:
- a housing having a cover portion, above the slat, that spans the width of the slat and has two opposing edges,
- said housing also having, fixed to each opposed edge of the cover portion, a wall portion that extends downwardly from the cover portion adjacent to one corresponding side of the slat, past the flange, and
- said housing further having, extending inwardly from each wall portion, below the flange, a lip that captures the flange to prevent withdrawal of the housing from the slat perpendicularly to the slat while allowing the housing to slide along the slat,
- a clamping member retained within the housing above the slat, and
- manually operable means for applying force between the housing and the clamping member to raise the housing relative to the slat so that the lips forcibly engage the flanges to clamp the housing to the slat at any user-selected point along the slat; and fastened to each bracket housing, a respective tie-down member that is adapted for attachment of such straps or the like and that is secured solely to one or both wall portions of that housing so that in use such upward forces transmitted from such straps or the like to the tie-down member are not applied to the cover portion in such a way as to deform the cover portion;

wherein such upward forces transmitted to the tie-down member are prevented from reducing the forcible engagement of the lips with flanges; and wherein the housing remains effectively clamped to the slat despite the presence of such upward forces.

2. The luggage carrier of claim 1, wherein:

each tie-down member is secured to one or both wall portions of its respective housing below the lip or lips; and such upward forces transmitted to the tie-down member push the lips more forcibly upward against the flange without tending to decrease the force between the housing and the clamping member.

3. The luggage carrier of claim 1, wherein:

each tie-down member is secured to both wall portions of its respective housing and includes (1) a two-ended crosspiece that passes over the cover portion of the housing, transversely with respect to the corresponding slat, and (2) on each side of the slat a leg portion interconnecting one respective end of the crosspiece with one respective wall portion of the housing below the respective lip.

* * * * *